United States Patent [19]

Ewing et al.

[11] 4,318,932
[45] Mar. 9, 1982

[54] INSTANT MILK PROCESS

[75] Inventors: Neal L. Ewing, Livermore; John J. Fisher, Danville, both of Calif.

[73] Assignee: Foremost-McKesson, Inc., San Francisco, Calif.

[21] Appl. No.: 914,767

[22] Filed: Jun. 12, 1978

Related U.S. Application Data

[63] Continuation-in-part of Ser. No. 837,934, Sep. 29, 1977, abandoned, which is a continuation-in-part of Ser. No. 820,403, Aug. 1, 1977, abandoned, which is a continuation of Ser. No. 678,986, Apr. 21, 1976, abandoned, which is a continuation-in-part of Ser. No. 582,744, Jun. 2, 1975, abandoned.

[51] Int. Cl.³ .............................................. A23C 9/16
[52] U.S. Cl. ................................ 426/285; 426/585; 426/588; 426/662
[58] Field of Search ................. 426/99, 285, 302, 334, 426/585, 586, 588, 587, 580, 590, 289, 465, 453, 547, 511, 601, 602, 613, 662, 663, 664, 92, 98

[56] References Cited

U.S. PATENT DOCUMENTS

| | | | |
|---|---|---|---|
| 2,622,984 | 12/1952 | Peebles et al. | 426/586 |
| 2,835,586 | 5/1958 | Peebles | 426/588 |
| 2,851,358 | 9/1958 | McCarthy | 426/588 |
| 2,911,300 | 11/1959 | Peeble | 426/580 X |
| 3,080,235 | 3/1963 | Hodson et al. | 426/588 |
| 3,126,289 | 3/1964 | Spilman et al. | 426/285 |
| 3,164,473 | 1/1965 | Shields et al. | 426/285 X |
| 3,238,045 | 3/1966 | Danish et al. | 426/285 |
| 3,279,924 | 10/1966 | Peebles | 426/285 X |
| 3,300,315 | 1/1967 | Nava et al. | 426/285 |
| 3,773,519 | 11/1973 | Pisecky et al. | 426/99 |
| 3,889,005 | 6/1975 | Brammer et al. | 426/602 X |
| 3,935,325 | 1/1976 | Gilmore et al. | 426/613 |

FOREIGN PATENT DOCUMENTS

| | | | |
|---|---|---|---|
| 285859 | 4/1966 | Australia | 426/602 |
| 681891 | 3/1964 | Canada | 426/453 |
| 48-14064 | 5/1973 | Japan | 426/602 |
| 49-38823 | 10/1974 | Japan | 426/588 |
| 51-06161 | 2/1976 | Japan | 426/602 |
| 7605947 | 12/1976 | Netherlands | 426/588 |

Primary Examiner—William F. Smith
Attorney, Agent, or Firm—Flehr, Hohbach, Test, Albritton & Herbert

[57] ABSTRACT

A process for the manufacture of instant fat-containing dry milk and flavored dry milk products. Anhydrous non-fat milk powder is used as a source material and fat in the form of a fat emulsion is added in the instantizing or agglomerating operation. The fat emulsion is one prepared in such a manner that it is stable with respect to reversal of the emulsion phase. In one processing step the anhydrous powder is treated in an agglomerating chamber to which is supplied separately atomized materials comprising fat emulsion and lecithin, accompanied by sufficient moisture to cause the milk particles to become sticky and to form random aggregates which incorporate the fat emulsion and the lecithin as extraneous lecithin. The aggregates are dried to produce the desired instant fat containing dry milk product. Also instant fat-containing dry milk products produced by the process which are characterized by good storage stability, good wettability and dispersibility in cold water, and by their ability to provide a reconstituted milk of good quality that is not subject to objectionable cream separation.

12 Claims, 4 Drawing Figures

INSTANT MILK PROCESS

CROSS-REFERENCE TO COPENDING APPLICATIONS

This invention is a continuation-in-part of copending application Ser. No. 837,934, filed Sept. 29, 1977 (now abandoned), which is a continuation-in-part of application Ser. No. 820,403 filed Aug. 1, 1977 (now abandoned), the latter being a continuation of application Ser. No. 678,986 filed Apr. 21, 1976 (now abandoned), which is a continuation-in-part of Ser. No. 582,744 filed June 2, 1975 (now abandoned).

BACKGROUND OF THE INVENTION

This invention relates generally to processes for the commercial manufacture of fat-containing dry milk or flavored dry milk in the form of aggregates which can be readily dispersed in water to form a stable reconstituted milk. Also, it pertains to products resulting from such processes.

So-called instant dry milk is widely manufactured and sold in the United States and other countries. As disclosed in Peebles U.S. Pat. No. 2,835,586 dated May 20, 1958, the process involves supplying nonfat anhydrous dry milk powder to an agglomerating chamber where the particles are moistened and commingled to cause formation of random porous aggregates. These aggregates, which in typical instances may have a total moisture content of the order of from 10 to 15%, are then subjected to secondary drying to remove excess moisture. Such instant nonfat dry milk can be readily reconstituted in cold water by simple stirring and without vigorous agitation. The process of said Pat. No. 2,835,586 can be used to agglomerate anhydrous spray dried fat-containing dry milk as well as spray dried nonfat milk powder. However, instant fat-containing milk made in this fashion has impaired wettability and dispersibility in water, and the reconstituted milk is subject to fat separation or creaming off.

Subsequent to the development of the above Peebles process, it was found that an acceptable fat-containing agglomerated dry milk could be formed by the use of lecithin. As described in U.S. Pat. No. 3,164,473 dated Jan. 5, 1965, lecithin is supplied in such a fashion that in the final agglomerated product it is in the form of extraneous lecithin distributed on the powder particles and agglomerates. The use of lecithin as described in said U.S. Pat. No. 3,164,473 makes it possible to produce a fat-containing instant dry milk which can be reconstituted in cold water. However, it makes use of fat-containing spray dried milk powder as a source material. An improved process making use of the process of U.S. Pat. No. 3,164,473 is disclosed in U.S. Pat. No. 3,300,315 dated Jan. 24, 1967. The improved process likewise makes use of fat-containing milk as a source material. The liquid fat-containing milk is spray dried to form a moist powder which is passed through an agglomerating chamber into which an atomized mixture of steam, water and lecithin is introduced. The resulting aggregates, after removal of excess moisture, having relatively good dispersibility in cold water. The processes of U.S. Pat. Nos. 3,164,473 and 3,300,315 have been used for the commercial manufacture of acceptable instant dry milk products having a fat content of the order of 5%. However, since plants using such processes are dependent upon use and availability of fat-containing spray dried milk, they require placement in a fluid milk shed, high capital investment in central locations (e.g., for evaporators, spray dryers, instantizers, etc.) and involve high transportation costs when the product is distributed nation-wide. In contrast with the nonfat dry milk powder, which is widely available commodity, spray dried fat containing milk is not widely available and requires storage under special conditions to prevent deterioration by oxidation.

U.S. Pat. No. 2,911,300 dated Nov. 3, 1959, proposes to produce a dry instant milk product containing fat by first forming nonfat milk solids in the form of aggregates, and after drying to remove excess moisture, fat in molten form is applied to the surfaces of the aggregates. As pointed out in said Pat. No. 2,911,300, such a product can be dispersed in warm water. The patent further proposes the use of a fat-water emulsion of the type disclosed in Peebles et al. U.S. Pat. No. 2,622,984 dated Dec. 23, 1952, which consists of fat and water together with a soluble caseinate. This mixture is subjected to homogenizing as ordinarily applied in tthe milk industry, after which it is atomized and applied to the previously formed dry aggregates and the aggregates again dried to remove excess moisture. U.S. Pat. No. 2,911,300 also refers to the use of lecithin as an emulsifier in preparing the emulsion of U.S. Pat. No. 2,622,984, in place of part or all of the caseinate content. While the process of U.S. Pat. No. 2,911,300 makes use of nonfat milk solids as a source material, it first forms and then dries the nonfat milk aggregates, and thereafter in a separate step the atomized fat emulsion is applied. Since some moisture is added with the fat, the moisture content of the aggregates is increased, thus requiring another stage of secondary drying. The several steps add to processing costs and thus the process is relatively uneconomical. Also this process is subject to other difficulties, particularly in that some fat separation tends to occur in the reconstituted milk, and the amount of separating fat increases for the higher fat contents. Since the lecithin (when used) is incorporated in the fat emulsion as an emulsifying agent, it does not function as extraneous lecithin to produce good wettability.

SUMMARY OF THE INVENTION AND OBJECTS

In general, it is an object of the present invention to provide a process for the manufacture of fat-containing instant dry milk that is relatively economical and which carries out an agglomerating operation and the application of fat and extraneous lecithin in a single step.

Another object is to provide a process which produces instant fat-containing dry milk of acceptable quality, using nonfat spray dried milk powder as a source material, which can be readily reconstituted with warm or cold water to form a stable reconstituted milk which is not subject to objectionable fat separation and which has good storage stability and good flavor characteristics when reconstituted with cold water.

Another object is to provide a process making use of fat emulsion that has been stabilized in such a manner that no significant reversal of the emulsion phase (i.e., demulsification) occurs during the process.

Another object is to provide an instant fat-containing dry milk which has at least a substantial part of its fat content in the form of relatively small globules of micron size on the particles of the aggregates, with lecithin being incorporated in such a manner as to be effective in promoting wettability and dispersibility of the product.

Another object is to provide an instant fat containing dry milk which when reconstituted with cold water as by stirring with a spoon forms a stable reconstituted milk of food beverage quality which is substantially free of fat separation.

In general, the process of the present invention involves supplying an anhydrous nonfat dry milk powder, such as is produced by spray drying, to an agglomerating chamber. Moisture containing atomized material is supplied to the chamber, the material consisting of an atomized stable fat-water emulsion having the bulk of its fat globules less than 3 microns in size, and separately atomized and separately introduced lecithin. With the chamber the milk powder and other materials are commingled and the moisture content of the atomized material is such that the powder particles are made sticky and caused to adhere together in the form of porous random aggregates, with the separately atomized fat and lecithin being distributed on the powder particles and the aggregates, simultaneously with formation of the agglomerates. The moist agglomerates discharging from the agglomerating chamber are then subjected to drying for the removal of excess moisture. The resulting instantized product has desirable properties, including good storage stability at ambient temperature, good wettability and dispersibility in cold water, and it provides a reconstituted milk of good beverage quality which is not subject to noticeable cream separation.

Additional objects and features of the invention will appear from the following description in which the preferred embodiments have been set forth in detail in connunction with the accompanying drawing.

DESCRIPTION OF THE PREFERRED EMBODIMENTS

Figure 1:
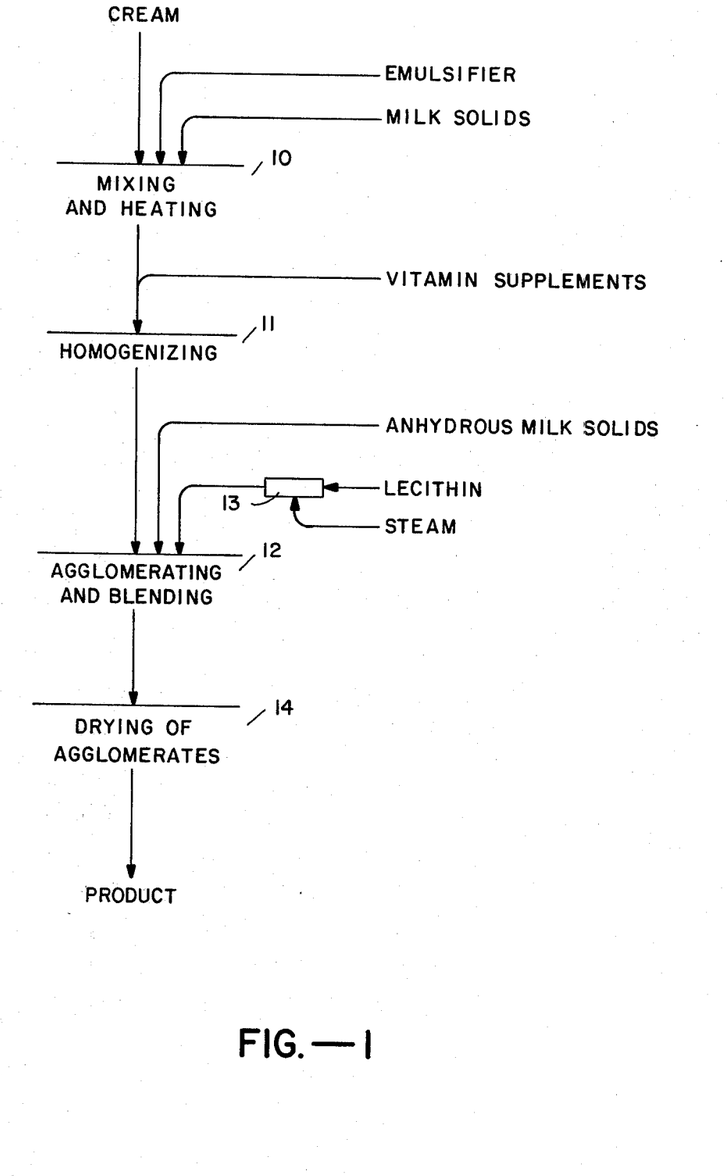
FIG. 1 is a diagram illustrating one procedure for carrying out the process.

The process as illustrated in FIG. 1 makes use of anhydrous spray dried milk powder as the source material, and dairy cream as a source of fat. As is well known, the major portion of the lactose content of such powder is in the amorphous form. Dairy cream normally contains water, fat, protein and some lactose. The water content may vary from about 54 to 58%, the fat from 38 to 42%, the protein from 2 to 2.5%, and the lactose from 2.8 to 3.4%. A typical cream is an emulsion containing about 56% water, 39% fat, 2.2% protein, and 3.1% lactose, with an ash content of about 0.4%. Before subjecting the cream to homogenizing step 11 to reduce the size of the fat globules, it is mixed in step 10 with one or more stabilizing agents. One such agent is soluble milk protein which can be supplied by adding nonfat milk (e.g., skim milk) solids. It serves certain purposes as subsequently explained. Other stabilizing agents that have been used are certain emulsifiers having such characteristics that they will not impair the flavor and quality of the final product. Satisfactory emulsifiers are those selected from the group consisting of mono and diglycerides, ethoxylated mono and diglycerides, and diacetyl tartaric acid esters of mono and diglycerides, or combinations thereof, having a melting point below about 150° F. (e.g., within the range of about 85° to 150° F.). In practice we have obtained good results by using a mixture of from 10 to 25% (optimum 17%) of distilled monoglycerides and from 90 to 75% (optimum 83) of ethoxylated mono and diglycerides, at a level of from 1 to 3% (optimum 1.5%) of the butterfat. Also we have obtained good results using a mixture of distilled monoglyderides and 20% of the diacetyl tartaric acid esters of mono and diglycerides used at a level of about 1% of the butterfat. These materials together wiith the cream are blended at a temperature (e.g., 150° F.) above the melting point of the emulsifiers.

Added soluble milk protein promotes sulhydrdryl (i.e., SH) development by heat treatment which promotes storage stability of the final product. Also it promotes stability of the fat-water emulsion produced by subsequent homogenization, thus inhibiting phase reversal. The nonfat milk solids which can be added to the cream in step 10 as indicated provide a source of milk protein. The amount of nonfat milk solids added at this point is in accordance with the fat content of the cream. It may range from an amount (by weight) equal to the amount of fat, to about one-half the amount of fat. As presently explained, the emulsifier when used permits more extended heat treatment without protein coagulation during high pressure homogenization, and in addition, it aids in preventing phase reversal of the fat-water emulsion.

Introduction of milk solids in step 10 for mixing with the cream can be facilitated by first dispersing the dry milk solids in water and then blending the resulting reconstituted milk with cream. For example, the amount of milk solids dispersed in water can be such as to provide a reconstituted milk concentrate consisting of 40 to 50% solids. A freshly prepared skim milk concentrate of 40 to 50% solids, condensed from fresh fluid skim milk, may also be used instead of such reconstituted milk. The total amount of moisture in the mix should be consistent with the moisture requirements for the agglomerating operation. A soluble milk protein, or a spray dried milk having some fat content, may be substituted for nonfat dry milk solids.

For the purpose of further promoting storage stability, small amounts of an antioxidant may be added to the cream, the amount being based on the fat content. The cream may also serve as a carrier for nutrient fortification, as for example, such nutrients as vitamins A and D, which may be added immediately before homogenizing, as indicated in FIG. 1.

The mixture produced in step 10, at a temperature of about 145° to 150° F., is supplied to the homogenizing step 11 where it is homogenized at relatively high pressures, such as pressures of 2000 to 4500 psig for the first stage and 500 psig for the second stage. Homogenization at such high pressures serves to greatly reduce the size of the fat globules whereby the bulk of the globules have a size of the order of less than 3 microns.

In step 10 or as a separate step immediately following mixing, it is desirable to subject the cream to heat treatment at a temperature of from 150° to 190° F. for a controlled holding time to promote storage stability by sulfhydryl development. It has been found that if a cream (e.g., having 22.5% fat and 45% total solids)

without the emulsifier is heated to about 180° F. and held at that temperature for an extended period (e.g., 10 minutes or more) subsequent homogenizing at high pressures causes undesirable gelation and increase in viscosity. However, without the emulsifier the holding time may be reduced to about 2 to 3 minutes with satisfactory sulfhydrl development. Also when followed immediately by high pressure homogenization, gelation does not occur to any appreciable extent and the resulting homogenized cream is not subject to phase reversal. A shorter heat treatment time is desirable because it avoids possible denaturation of heat denaturable protein which if permitted would increase the solubility index of the final product.

As previously explained, the added milk protein aids in preventing phase reversal of the emulsion during and after further processing. This is attributed to association of the added milk protein with the enrobement of the fat globules.

After being homogenized in step 11, the fat emulsion mixture is supplied to the agglomerating step 12 where it is dispersed in atomized form and the atomized droplets caused to commingle with particles of dry milk powder being continuously supplied to the agglomerating chamber. A spray dryer type of atomizing nozzle can be used, with the fat emulsion mixture being supplied to the nozzle at pressures of the order of 1500 to 4000 psig (3000 psig optimum).

Sufficient moisture is supplied to the agglomerating chamber to cause moistening of the powder particles with agglomeration of the particles together. In the agglomerating step the materials are effectively blended and the atomized and agglomerated fat mixture become intimately associated with the powder particles and the resulting aggregates.

Lecithin or lecithin product is supplied to provide a wetting agent which increases wettability and dispersibility of the final product in cold water. The lecithin is introduced into the agglomerating step 12 in atomized form and separate from the homogenized fat mixture. As shown in FIG. 1, the lecithin may be supplied to a mixing device 13 where it is intermixed with steam being supplied to the agglomerating chamber. When introduced in this manner the lecithin maintains its effectiveness in promoting wettability and dispersibility of the final product. When lecithin is mixed or homogenized with milk protein such as is present in the cream and the added nonfat milk solids, the wetting abilities of the lecithin are greatly impeded.

The agglomerating step can be carried out in an agglomerating chamber of the type disclosed in said U.S. Pat. No. 2,835,586, or equipment as disclosed in U.S. Pat. No. 3,311,306 dated July 18, 1967. Within this chamber the anhydrous milk powder is commingled and blended with the added atomized material. The discrete aggregates discharging from the agglomerating chamber in a typical instance have a total moisture content ranging from about 9 to 17% (11 to 15% optimum). A substantial part (e.g., 13 to 14%) of this moisture is derived from the cream mixture, and the remainder may be derived from the condensed steam introduced with the lecithin. That part derived from the emulsion, which is absorbed by the anhydrous milk particles as they are contacted by the emulsion, substantially reduces the moisture content of the emulsion, thus facilitating the following drying of the aggregates. The final or secondary drying step 14 can be carried out by the procedure described in said U.S. Pat. No. 3,300,315 to produce a final dry product of the desired moisture content (e.g., 1 to 2%).

As pointed out in said U.S. Pat. No. 3,300,315, lecithin is the commercial or popular name for a crude mixture of compounds which may be more accurately designated as phosphatides or phospholipids. The phosphatides are complex organic compounds which are similar to fats or lipids but differ from fats radically enough to give them unique properties. Lecithins of vegetable oil origin are mixtures of phosphatides produced from such raw materials as cottonseed oil, corn oil, or soybean oil. Products from current commercial treatments which modify natural lecithin to emphasize either the lipophilic groups or the hydrophilic groups may be used. Commercially available soya lecithin has been used with good results. It is commercially available as a liquid material with lecithin dispersed in a soybean oil carrier. Assuming that the liquid lecithin product contains about 60% lecithin, from 0.25 to 1% of such a lecithin product can be employed to obtain a final product containing from, say, 0.16 to 0.6% lecithin.

The use of steam in conjunction with atomizing material supplied to the agglomerating chamber is desirable in that it provides an elevated temperature in the agglomerating chamber (e.g., 120° to 180° F. in the general region in which steam is introduced) which facilitates formation of aggregates, and in addition, it aids effective atomization with uniform distribution of the atomized material upon the powder particles and provides some of the required moisture. Introduction of atomized lecithin with the steam causes the lecithin to be effectively dispersed and incorporated with the aggregates as a separate or extraneous material. In general, it is satisfactory to supply culinary steam at a suitable pressure (e.g., 120 psi).

All of the fat of the final product is supplied to the agglomerating step 12 by way of the homogenized mixture from step 11. This simplifies commercial processing because nonfat spray dried milk is not subject to flavor or quality deterioration when stored and shipped in sealed containers without the use of nitrogen or other inert gas. Also as previously explained, nonfat spray dried milk is widely produced and readily available.

It is desirable for the nonfat dry milk employed to have a relatively low solubility index, as for example, an index of the order of 0.1 or less. A low solubility index indicates a minimum amount of denaturation of the heat coagulable protein of the milk. When the protein is denatured to a substantial extent, it tends to settle out in the reconstituted milk, thus impairing its quality as a beverage. It should be understood, however, that the process of the present invention can be used with milk having a solubility index in excess of 0.1. Processing according to the present invention does not appreciably increase the solubility index of the original powder.

A typical sieve analysis of a product made according to the present invention, with a fat content of 5% (dry solids basis) is as follows:

| Mesh Screen (U.S. Standard) | Percent |
| --- | --- |
| On 80 | 54.5 |
| On 100 | 25.0 |
| Through 100 | 20.5 |

The pour bulk density of a typical product made in accordance with the process described above is of the order of 0.20 to 0.30 grams per milliliter. A pour bulk density of b 0.27 is typical of a product having the above sieve analysis and having a fat content of 5% (dry solids basis). The product produced as described above has good wettability and can be readily dispersed in cold water (e.g., 68° F.) by simple stirring to form a stable reconstituted milk. Thus, when a quantity is introduced into cold water to form a reconstituted milk, simple stirring with a spoon for a period of the order of 10 to 50 seconds suffices to completely disperse the material. Assuming the source milk powder has a protein content that is not seriously denatured by heat treatment, the reconstituted milk is stable in that no substantial settlement of solids occurs when the milk is permitted to stand for extended periods of the order of 24 hours or more.

A characteristic of the products made according to the foregoing process, which may have fat contents ranging from 2% to about 10% (dry solids basis), is that when reconstituted with cold water and permitted to stand for periods of the order of 24 hours or more, there is minimal or no noticeable separation of free fat or cream at the surface of the liquid. We attribute this to certain features of the process, including the processing of the cream in such a manner as to produce a stable emulsion. Stability of the fat emulsion in this instance is attributed to pretreatment before homogenizing, the presence of the milk protein of the added nonfat milk solids, and high homogenizing pressures. Good wettability and dispersibility of the product is attributed not only to the physical character of the aggregates, but in addition, to the fact that the lecithin is applied and remains separate from the fat, and therefore is present in such form as to be more effective as a wetting agent. As previously mentioned, when lecithin is added to the emulsion, nonfat milk components present, including added protein or nonfat milk solids, cause the wetting abilities of the lecithin to be impeded. Although not proven, it is believed that the milk proteins tend to enrobe the lecithin, thereby blocking its wetting ability in the final product. This enrobing or blocking effect does not take place when the lecithin is separately atomized and separately introduced into the agglomerating chamber.

Figure 2:
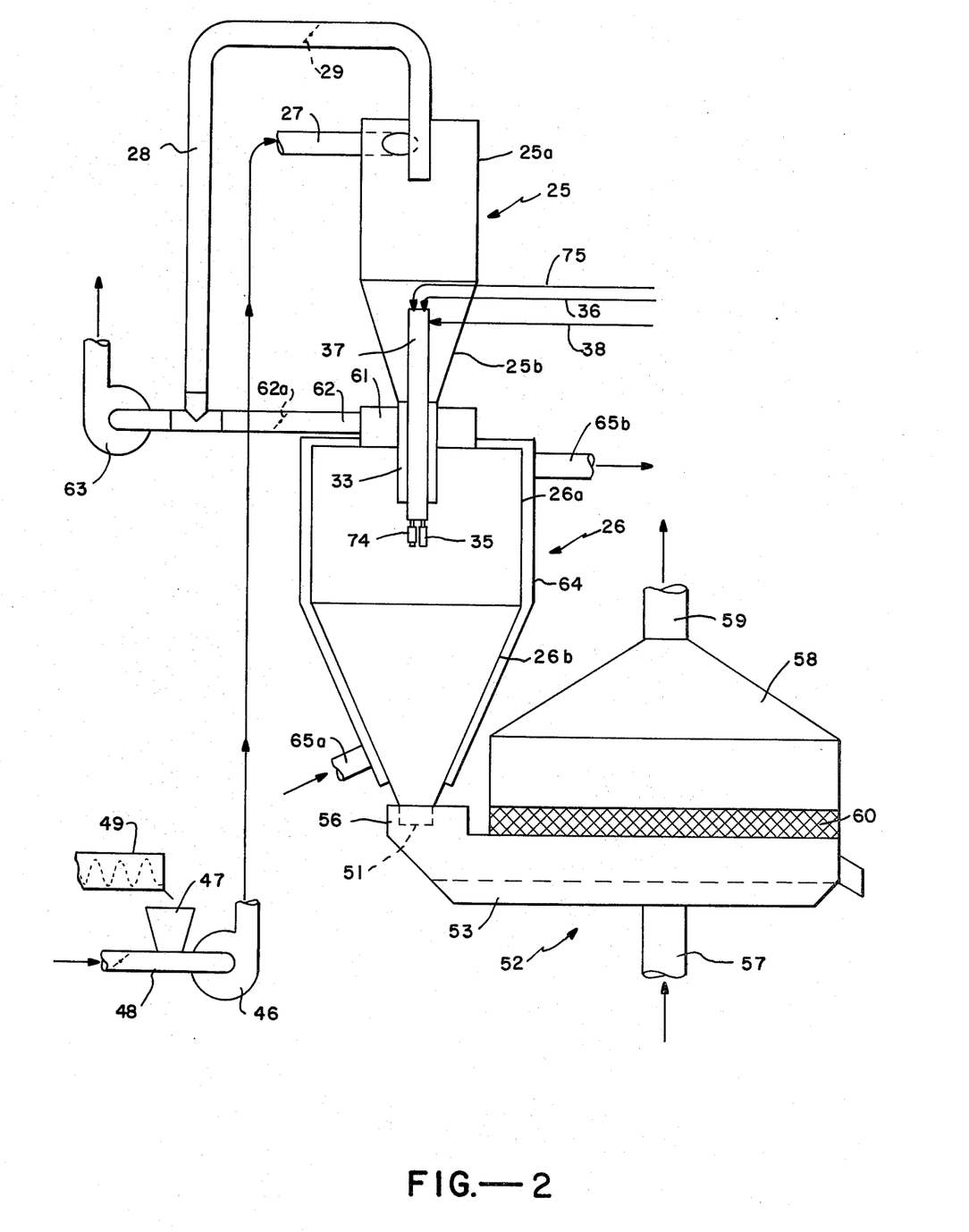
FIG. 2 schematically illustrates suitable apparatus for carrying out the process.

The apparatus for carrying out the process shown in FIG. 2 consists of a cyclone feed chamber 25 together with a treatment or agglomerating chamber 26. The cyclone chamber corresponds generally to that of a conventional pneumatic cyclone, as is shown consisting of the upper cylindrical portion 25a and the lower conical shaped portion 25b. A feed supply conduit 27 connects tangentially with the upper portion of the chamber, and an exhaust conduit 28 communicates with the central region of the cyclone chamber and serves to remove air from which powder has been centrifugally separated.

The treatment chamber 26 is shown provided with an upper cylindrical shaped portion 26a together with a lower conical shaped portion 26b. The chamber 26 is in direct communication with the lower end of the cyclone through the coupling conduit 33. It will be noted that the cyclone and the treatment chamber 26 are in axial alignment.

Figure 3:
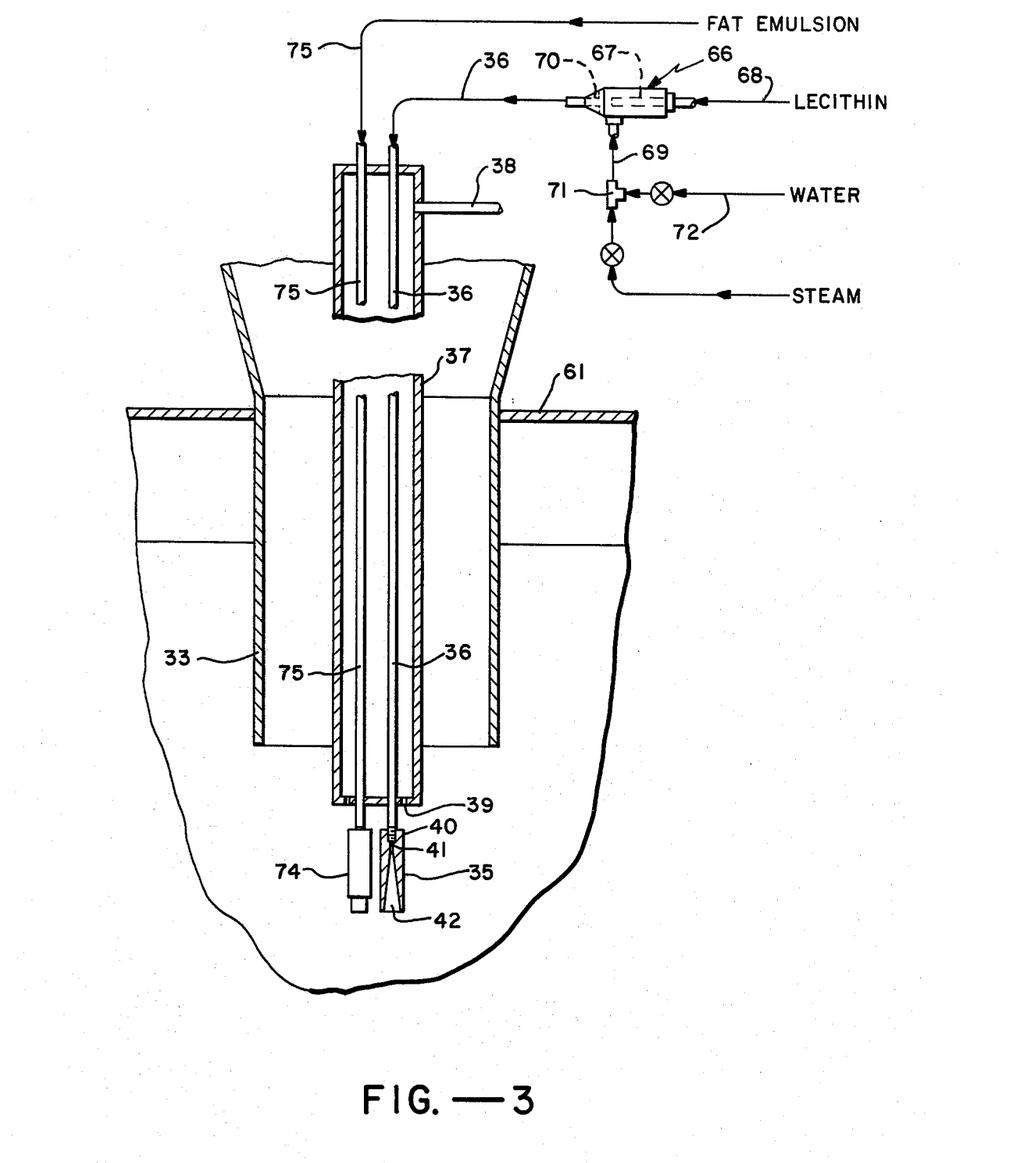
FIG. 3 schematically illustrates apparatus associated with the agglomerating chamber for introducing the individual materials into the chamber.

The means employed for introducing a fluid mixture in atomized form may be as illustrated in FIG. 3. It consists of a spray nozzle 35 attached to the lower end of the supply pipe 36. The portion of the pipe 36 extending immediately above the nozzle is enclosed within the jacket 37. One portion of this jacket is connected by pipe 38 with a source of cool air under pressure and the lower end of the jacket is provided with openings 39 from which air is discharged into a region generally surrounding the nozzle 35.

During operation of the apparatus, jacket 37 serves the purpose of preventing contact between the powder being treated and the pipe 36 which, under certain operating conditions, might cause accumulation of solid material. Also the downwardly directed air jets discharging from apertures 39 into the region surrounding the nozzle 35 tend to prevent back swirl and accomulation of solid material on the nozzle.

Figure 4:
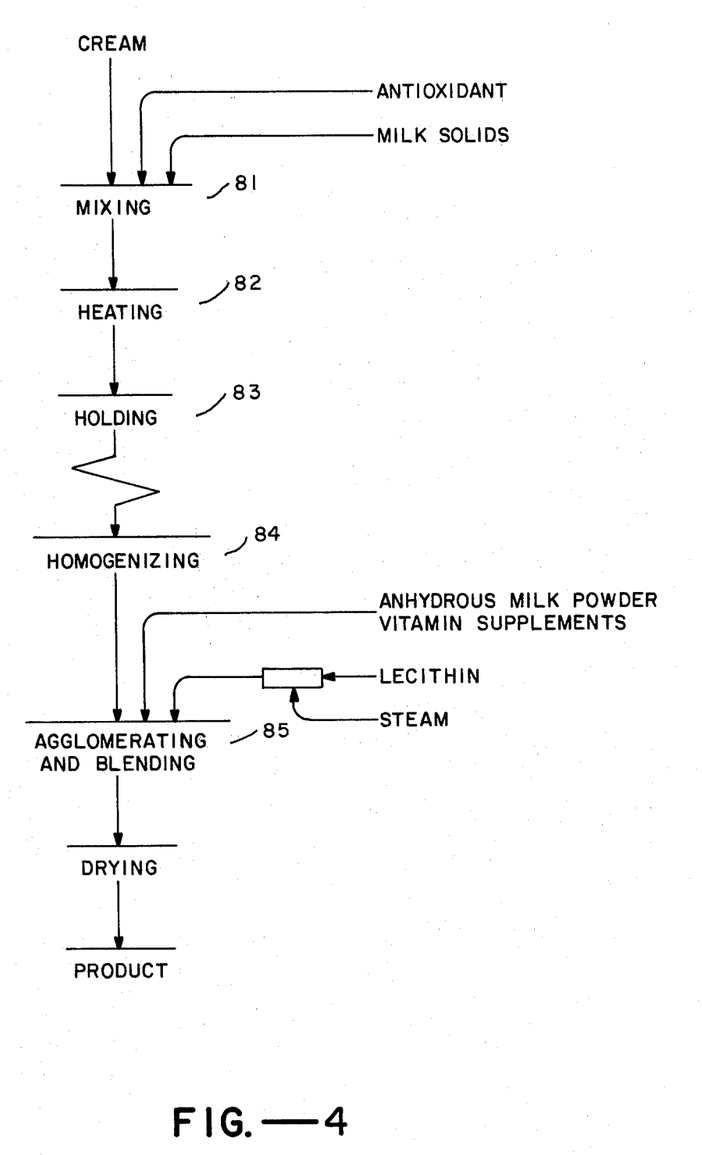
FIG. 4 is a diagram illustrating another procedure for carrying out the process.

The nozzle 35 shown in FIG. 4 consists of a body 40 which is attached to the pipe 36. It has an orifice 41 and a divergent passage 42 extending from the orifice. A nozzle of this type serves to direct a divergent conical shaped spray into the treatment chamber. The nozzle 35 is within the upper portion of the treatment chamber, and is generally aligned with the central vertical axis of the chamber.

Conventional means can be used for supplying dry milk powder together with an airstream to the conduit 27 (FIG. 2). As illustrated schematically in FIG. 2, the conduit 27 may connect to the discharge side of blower 46. A powder hopper 47 communicates with the inlet conduit 48. A powder feed means 49, such as one of the feedscrew type, serves to deliver powder at the desired regulated rate to the hopper 47.

The treated material in the form of moist porous aggregates drops by gravity through the lower end 51 of the treatment chamber 26. As shown in FIG. 2, the discharge opening 51 is shown delivering the moist material directly to the dryer 52. This dryer can be of the shaker type consisting of a main body 53 which has an outlet end 56 coupled directly to the lower end of the treatment chamber. Warm dry air is introduced below the screen through conduit 57. Air is removed from the space over the screen by the hood 58 and conduit 59. The flexible cloth walls 60 couple the lower end of the hood to the upper side of the body 53. It will be understood that two or more stages of such drying units can be used as desired.

The upper part of chamber 26 is shown connected by chamber 61 and conduit 62 with a suction fan 63. This conduit also connects with the exhaust conduit 28. By adjusting the damper 62a, a controlled amount of cool atmospheric air may be drawn into the lower opening 61, thus causing the downwardly falling aggregates to be enveloped in upwardly moving temperate air.

The walls of the chamber 26 can be kept at a temperature corresponding generally to the mean temperature of the atmosphere within the same. Thus, these walls may be covered by heat insulating material, or they may be provided with a jacket 64 connected with the hot air supply conduit 56a and the discharge conduit 56b. With this arrangement, warm air can be circulated through the jacket to maintain the walls of the chamber at a desired temperature level.

FIG. 3 shows means for supplying the nozzle 35 with lecithin and steam. It consists of a mixing device 66 having a tapered discharge end connected to line 36. The hollow body has an inner tube 67 which connects with the incoming line 68. Also the body has a side inlet which connects with the incoming line 69. Swirl fins or vanes 70 are shown within the tapered portions of the body. Line 68 connects with suitable means, such as a metering pump, which is capable of supplying the lecithin product at a predetermined controlled rate. Line 69 connects with a source of steam as illustrated, and a mixer 71 connected with a source of water as indicated by line 72 may be connected in this line.

As illustrated in FIG. 3, an additional nozzle 74 is provided alongside the nozzle 35. This may be a high pressure atomizing nozzle such as is commonly used in milk spray drying equipment. Pipe 75 connects with nozzle 74 and is supplied with the homogenized mix from the homogenizing step 11. A suitable high pressure pump supplies the material to pipe 75 at a relatively high pressure of the order of 1500 to 4000 psig. Atomizing nozzle 74 produces a divergent spray through which the downwardly moving powder passes, with the spray being commingled with lecithin and water vapor being sprayed downwardly by the nozzle 35. Thus the powder particles commingle and are blended with the homogenized fat-containing mixture produced in atomized form by the nozzle 35, while at the same time the powder particles are commingled and blended with droplets of lecithin dispersed by the steam, and the steam plus the moisture present in the fat emulsion creates a humid atmosphere.

Operation of the arrangement shown in FIG. 3 is as follows. Steam at constant pressure (e.g., 120 psig) is supplied to line 69, and the lecithin product in liquid form is supplied through line 68 at a predetermined rate. The steam supplied by way of line 68 is caused to be intermixed with the lecithin by virtue of the swirling action induced by the vanes 70. As a result, a relatively homogeneous mixture of lethicin and steam is delivered through line 36 to nozzle 35. Some water can be introduced together with the steam by controlled admission through line 72, depending upon the moisture and temperature requirements within the agglomerating chamber.

As described above, dairy cream is used as a source of fat. However, in place of using dairy cream it is possible to use butter oil together with sufficient nonfat dry milk powder and water, whereby the material after being homogenized in step 10 has the desired fat, milk solids and water contents for use in the agglomerating step 12. While the products made by use of butter oil are of good quality, it has been our observation that the flavor is slightly different from products made with dairy cream, which is attributed to the relatively strong butter flavor of the butter oil.

In the procedure shown in FIG. 4, the emulsifier is omitted and short-time heating is employed. In step 81 cream is mixed with an antioxidant and milk solids, and this mixture is heated and subjected to a relatively short holding period as indicated by steps 82 and 83. Preferably this is carried out in a continuous manner by causing the mix to flow through a heat exchanger whereby it is heated to a temperature of the order of 150° to 190° F. and then causing it to flow at a constant rate through the indicated holding tube, whereby it is held at such temperature for a period of the order of 2 to 4 minutes. This provides storage stability of the final dry product by sulfhydryl (i.e., SH) development. The discharging mix is then subjected to homogenizing 84, carried out by high pressure homogenizing equipment. The first homogenizing stage is at relatively high pressures of the order of 3600 to 4500 psi, and the second stage at 500 psi. The homogenized emulsion is then supplied under pressure to the agglomerating step 85 which is carried out by the same equipment, and in the same manner as step 12 of FIG. 1.

Elimination of the emulsifier in FIG. 4 is made possible by the manner in which the cream is heated and held in a continuous manner for a controlled holding period and by us of relatively higher homogenizing pressures than that required when the emulsifier is employed.

When it is desired to provide the final product with vitamin supplements, such as vitamins A and D, we prefer that they be premixed with the anhydrous milk powder as indicated in FIG. 4. This avoids subjecting such heat sensitive materials to elevated temperatures in steps 82, 83 and 84. Examples of the process are as follows:

EXAMPLE 1

In this example a product was prepared having a fat level of 5%. The procedure was generally as illustrated in FIG. 1. The source material was commercial spray dried anhydrous nonfat milk powder having a bulk density of about 612 grams per liter and a total moisture content of about 2%. The solubility index was about 0.1. This powder was fed pneumatically at a metered rate to an agglomerating chamber as shown in FIG. 3. A good quality edible fresh dairy cream analyzing 40% butterfat was adjusted to a fat level of 22.5% fat and 45% total solids by the addition of nonfat dry milk powder reconstituted in water. To this cream there was added 1.5% of emulsifier (on a fat content basis), the emulsifier being a blend consisting of 16.67% monoglycerides and 83.33% ethoxylated mono and diglycerides. The resulting mixture was heated to 180° F., held at that temperature for 10 minutes and then cooled to 145°–150° F. The mixture was then passed through a commercial homogenizing equipment, the first stage being at a pressure of 3000 psig, and the second stage at 500 psig. Homogenizing was carried out at a temperature level of 145° to 150° F. The nonfat milk solids were pneumatically conveyed into the agglomerating chamber. The homogenized cream mixture was pumped to the atomizing nozzle 74 at a pressure of 1500 to 2000 psig, the rate being consistent to produce the desired fat level in the final product. A soybean-lecithin product was metered into the steam line 69 at a rate to attain a 0.6% lecithin level in the final product. The amount of steam added was sufficient to control the moisture level of the aggregates leaving the agglomerating chamber at a total moisture level of about 10 to 11%. The moist agglomerated material was then dried to a moisture content below 2%.

The resulting instant fat-containing milk product was of excellent quality with a pour density of 0.27 grams per milliliter. When subjected to the wettability test as disclosed in U.S. Pat. No. 3,231,386, the wettability proved to be excellent, the powder sinking in cold water within a period of 15 to 20 seconds. When stirred in cold water the powder gradually dispersed over a stirring period of the order of 8 seconds to produce a reconstituted milk having its surface free of floating material. When stored in a refrigerator at a temperature of 40° F. for a period of 24 hours, no appreciable separated cream was noted upon the surface of the liquid. Also no appreciable amount of settled undissolved solids was noted. In general, the product when reconstituted was of good quality, having a good mouth feel and flavor.

EXAMPLE 2

In this example a product was prepared having a fat level of 5%. The anhydrous nonfat milk powder was the same as in Example 1. A cream mixture was prepared as in Example 1, except that a nonfat milk concentrate having about 45% total solids content was used in place of nonfat solids and water. To this cream there was added 1.0% emulsifier (on a fat content basis), the emulsifier being a blend consisting of 80% monoglycerides and 20% diacetyl tartaric acid esters of mono and diglycerides. Tenox 7 was added at 0.05% of the fat content. The resulting mixture was heated to 180° F., held at that temperature for 10 minutes, and cooled to 145° to 150° F. The mixture was then homogenized at 3500 psig in the first stage and 500 psig in the second stage. The remainder of the process as as in Example 1.

The resulting product had physical performance characteristics as in Example 1. No cream separation occurred upon reconstitution and refrigeration. In general, the reconstituted product was of good quality and of somewhat better flavor than the product produced in Example 1.

EXAMPLE 3

In this example a product was prepared having a butterfat level of 5%. The procedure was generally as illustrated in FIG. 4. The anhydrous nonfat milk powder employed was the same as in Example 1, and the cream was prepared as in that example. Tenox 7 was added at 0.05% of the fat content. However, the emulsifiers specified in Examples 1 and 2 were omitted. The cream mixture was heated from approximately 40° F. to about 170° F. in a plate-and-frame type heat exchanger. It was held at about 170° F. in a continuous holding tube for 2 to 3 minutes. The holding tube was connected directly to the homogenizer where the cream mixture was homogenized at 4000 psig in the first stage and 500 psign in the second stage. The homogenizer discharged the cream at 170° to 180° F. to a 3 to 5 gallon surge tank. Nearly as rapidly as the homogenized cream was being produced, it was supplied to a high pressure pump connected to the atomizing nozzle of the agglomerating chamber. The remainder of the processs was as in Example 1.

The resulting product had physical performance characteristics as in Example 1. Upon quiescent refrigeration of the reconstituted product for about 18 hours, only a very slight cream separation occurred. However, the separated cream could be dispersed by a simple swirling action of the container. After this dispersion, the cream would not separate again during the normal life of the reconstituted product. The flavor and mouth feel were of excellent quality. Wettability was about 10 seconds.

This Example 3 was a pilot plant trial.

EXAMPLE 4

The procedure of FIG. 4 was employed. Nonfat milk solids were mixed with dairy cream to provide a mix having 22.5% fat and 45% total solids. A small amount of Tenox 7 was added as in Example 1. This mix was then pumped continuously through a heat exchanger whereby its temperature was elevated to 170° F. and then through a holding tube for a holding period of 3 to 4 minutes. It was then supplied to a homogenizer adjusted to operate at a pressure of 4000 psig for the first stage and 500 psig for the second stage. The homogenized material was then delivered to a surge tank from which it was pumped to an atomizer nozzle of the agglomerator. The agglomerator was operated in the same manner as in Example 1, with separate introduction of atomized lecithin and steam. The final product had the same desirable properties as the product produced in Example 1. However, the wettability of the product was about 8.4 seconds.

This Example 4 was a production plant trial.

What is claimed is:

1. In a process for the manufacture of instant fat containing dry milk making use of an agglomerating chamber, the steps of supplying anhydrous dry milk powder to the chamber and causing the powder particles to be dispersed therein, further supplying moisture containing atomized material to the chamber, the material consisting of an atomized stable fat-water emulsion having the bulk of its fat globules less than 3 microns in size and atomized lecithin, said fat-water emulsion and said lecithin being atomized apart from each other and separately and simultaneously introduced into said chamber, each atomized material being caused simultaneously to commingle with the dispersed powder particles within the chamber, whereby moisture of the atomized material is absorbed by the powder particles to cause them to be made sticky and the sticky powder particles caused to contact and adhere together in the form of moist porous random aggregates, the atomized fat emulsion and the atomized lecithin being simultaneously distributed on the powder particles and the aggregates, discharging the aggregates from the chamber, and then removing excess moisture from the aggregates and the fat-water emulsion thereon to form a dry product, the fat content of the emulsion serving to impart a desired fat content to the final dry product.

2. A process as in claim 1 in which the amount of lecithin supplied with the material is such as to provide a lecithin content of from 0.17 to 0.6% in the final product.

3. A process as in claim 1 in which added soluble milk protein is incorporated in the emulsion.

4. A process as in claim 1 in which the stable emulsion is prepared by forming a mixture containing dairy cream and added soluble milk protein, heat treating the mix at an elevated temperature of from 150° to 190° F., and then homogenizing the mixture at high pressure to produce an emulsion having the bulk of its fat globules less than 3 microns in size.

5. A process as in claim 4 in which the heat treatment is carried out on a continuous flowing stream of the material.

6. A process as in claim 1 in which the fat-water emulsion is prepared by subjecting a fat-water mixture to high pressure homogenization whereby the bulk of the fat globules in the resulting emulsified material have a size of the order of less than 3 microns.

7. A process as in claim 6 in which the fat-water mixture includes an added emulsifier.

8. A process as in claim 7 in which the emulsifier is selected from the group consisting of mono and diglycerides, ethoxylated mono and diglycerides, and diacetyl tartaric acid esters of mono and diglycerides, or combinations thereof.

9. A process as in claim 1 in which the fat content of the emulsion has a melting point of the order of 70° to 120° F.

10. A process as in claim 1 in which the fat-water emulsion is prepared by forming a mixture comprising dairy cream and soluble milk protein, holding the mixture at a temperature of the order of from 150° to 190° F. for a period of the order of 2 to 4 minutes and then subjecting the mixture to high pressure homogenization at pressures of the order of 2000 to 4500 psig.

11. A process for the manufacture of instant fat-containing dry milk making use of an agglomerating chamber, the steps of supplying anhydrous dry milk powder to the chamber and causing the powder to be dispersed therein, further supplying moisture containing material to the chamber, the further material consisting essentially of lecithin and a fat-water emulsion, atomizing the lecithin and the fat-water emulsion apart from each other and separately and simultaneously introducing the atomized material into the chamber, the fat-water emulsion being prepared by mixing materials including fat, water and nonfat milk solids and by then subjecting the mixture to homogenization at pressures of the order of 2000 to 4500 psig whereby the bulk of the fat globules present in the homogenized material having a size of the order of less than 3 microns, and whereby the material has a minimum of free fat, the further introduction of the atomized materials being such that each material is commingled and blended with the dispersed powder particles within the agglomerating chamber whereby the powder particles are contacted with the atomized materials and caused to be made sticky and the sticky powder particles caused to contact and adhere together in the form of porous random aggregates with the fat and lecithin being distributed on the particles and the aggregates, discharging the aggregates from the chamber and then removing excess moisture from the aggregates to form a dry product.

12. A process for the manufacture of fat-containing dry milk making use of an agglomerating chamber comprising the steps of supplying nonfat anhydrous dry milk powder to the chamber and causing the powder particles to be dispersed therein, further supplying moisture containing material to the chamber, said material consisting essentially of lecithin and also a stable fat-water emulsion containing dairy cream and a soluble milk protein, atomizing said lecithin and said fat-water emulsion apart from each other and separately and simultaneously introducing each atomized material into the chamber, each atomized material being caused to commingle and blend with the dispersed powder particles within the chamber whereby the milk powder particles are caused to absorb moisture from the atomized material and become sticky, causing the sticky powder particles to contact and adhere together in the form of moist random aggregates with the fat and lecithin simultaneously being uniformly distributed on the particles and the aggregates, some of the moisture absorbed by the powder particles being derived from the fat-emulsion, the moist aggregates having a moisture content of from 9 to 17%, discharging the aggregates from the chamber and then removing moisture from the aggregates to form a dry product.

* * * * *